(12) United States Patent
Zhang et al.

(10) Patent No.: US 6,754,898 B2
(45) Date of Patent: *Jun. 22, 2004

(54) METHOD AND APPARATUS FOR CONVERTING A LIGHTWEIGHT MONITOR TO A HEAVYWEIGHT MONITOR

(75) Inventors: Hong Zhang, Redwood City, CA (US); Sheng Liang, Cupertino, CA (US)

(73) Assignee: Sun Microsystems, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/454,918

(22) Filed: Dec. 2, 1999

(65) Prior Publication Data

US 2003/0097396 A1 May 22, 2003

Related U.S. Application Data (60) Provisional application No. 60/111,400, filed on Dec. 8, 1998.

(51) Int. Cl.$^7$ .................................................. G06F 9/00
(52) U.S. Cl. ........................ 718/104; 709/100; 709/107
(58) Field of Search ................................. 709/100, 104

(56) References Cited

U.S. PATENT DOCUMENTS

| 5,450,592 A | | 9/1995 | McLeod |
| 5,761,670 A | * | 6/1998 | Joy .......................... 707/103 R |
| 5,790,851 A | | 8/1998 | Frank et al. |
| 6,247,025 B1 | * | 6/2001 | Bacon .......................... 707/102 |
| 6,314,563 B1 | * | 11/2001 | Agesen et al. .............. 717/108 |
| 6,411,983 B1 | * | 6/2002 | Gallop ........................ 709/104 |

OTHER PUBLICATIONS

Bacon et al., "Thin Locks: Featherweight Synchronization for Java", 1998, IBM T.J. Watson Research Center.

Bacon et al., "Thin Locks: Featherweight Synchronization for Java", ACM Sigplan Notices, Association for Commuting Machinery, New York, US, vol. 33, No. 5, pp. 258–268, May 1, 1998.

Anderson, T.E., "The Performance of Spin Lock Alternatives for Shared–Memory Multiprocessors", IEEE Transactions of Parallel and Distributed Systems, IEEE Inc., New York, U.S., vol. 1, No. 1, pp. 6–16, 1990.

Lui Sha et al., "Priority Inheritance Protocols: An Approach to Real–Time Synchronization", IEEE Transactions on Computers, IEEE Inc. New York, US, vol. 39, No. 9, pp. 1175–1185, Sep. 1, 1990.

\* cited by examiner

*Primary Examiner*—David Wiley
*Assistant Examiner*—Joseph E Avellino
(74) *Attorney, Agent, or Firm*—Beyer Weaver & Thomas, LLP (57) ABSTRACT

Methods and apparatus for converting a lightweight monitor to a heavyweight monitor are disclosed. According to one aspect of the present invention, a computer-implemented method for converting a lightweight monitor to a heavyweight monitor when an object that is owned by a second thread is unavailable to a first thread includes creating a new heavyweight monitor and setting the ownership of the new heavyweight monitor to the second thread. The first thread then enters the newly created heavyweight monitor without being forced to spin lock until the object is released by the second object.

17 Claims, 6 Drawing Sheets

METHOD AND APPARATUS FOR CONVERTING A LIGHTWEIGHT MONITOR TO A HEAVYWEIGHT MONITOR

CROSS-REFERENCE TO A RELATED APPLICATION

This application claims benefit of priority under 35 U.S.C. §119(e) of U.S. Provisional Application No. 60/111,400 filed Dec. 8, 1998 which is hereby incorporated by reference. This application is also related to co-pending patent application Ser. No. 09/454,234, entitled "METHOD AND APPARATUS FOR USER LEVEL MONITOR IMPLEMENTATION" filed simultaneously herewith, which is assigned to the assignee of the present application and is incorporated herein by reference in its entirety.

BACKGROUND OF THE INVENTION

1. Field of Invention

The invention relates generally to methods and apparatus for converting a lightweight monitor to a heavyweight monitor in an object-based computing system. More particularly, the invention relates to methods and apparatus for atomically converting a lightweight monitor associated with a contended object to a corresponding heavyweight monitor in an object-based computing system.

2. Description of Relevant Art

Within an object-based environment, threads are often used to satisfy requests for services. A thread may be thought of as a "sketch pad" of storage resources, and is essentially a single sequential flow of control within a computer program. In general, a thread, or a "thread of control," is a sequence of central processing unit (CPU) instructions or programming language statements that may be independently executed. Each thread has its own execution stack on which method activations reside. As will be appreciated by those skilled in the art, when a method is activated with respect to a thread, an activation is "pushed" on the execution stack of the thread. When the method returns, or is deactivated, the activation is "popped" from the execution stack. Since an activation of one method may activate another method, an execution stack operates in a first-in-last-out manner.

During the execution of an object-based program, a thread may attempt to execute operations that involve multiple objects. On the other hand, multiple threads may attempt to execute operations that involve a single object. Frequently, only one thread is allowed to invoke one of some number of operations, i.e., synchronized operations, that involve a particular object at any given time. That is, only one thread may be allowed to execute a synchronized operation on a particular object at one time. A synchronized operation, e.g., a synchronized method, is block-structured in that it requires that the thread invoking the method to first synchronize with the object that the method is invoked on, and desynchronize with that object when the method returns. Synchronizing a thread with an object generally entails controlling access to the object using a synchronization construct before invoking the method.

Synchronization constructs such as locks, mutexes, semaphores, and monitors may be used to control access to shared resources during periods in which allowing a thread to operate on shared resources would be inappropriate. By way of example, in order to prevent more than one thread from operating on an object at any particular time, objects are often provided with locks. The locks are arranged such that only the thread that has possession of the lock for an object is permitted to execute a method on that object. With respect to FIG. 1, a process of acquiring an object lock will be described. The process of acquiring an object lock begins at step 104 where a thread obtains the object on which the thread wishes to operate. In general, the object on which the thread intends to operate has an associated object lock. Then, in step 106, a determination is made regarding whether the object is locked. That is, a determination is made regarding whether the object lock associated with the object is held by another thread, e.g., a thread that is currently operating on the object.

Figure 1:
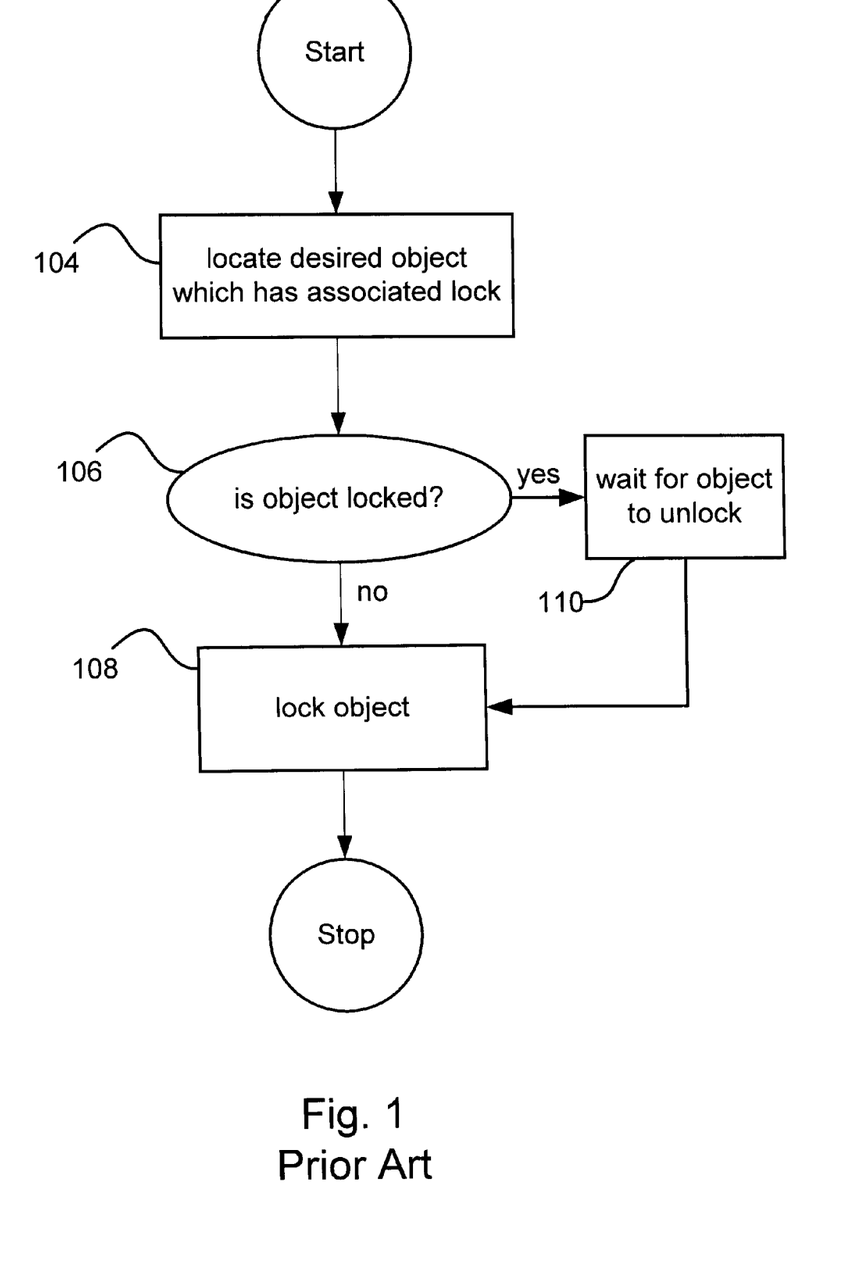
FIG. 1 is a process flow diagram illustrating the steps associated with a conventional method of locking an object.

If the determination in step 106 is that the object is not locked, then the thread acquires the object lock in step 108. Alternatively, if the object is locked, then the thread waits for the object to be unlocked in step 110. Once the object is unlocked, process flow moves from step 110 to step 108 where the object is locked by the thread.

As previously mentioned, a thread is permitted to execute a synchronized operation on an object if it successfully acquires the lock on the object. While one thread holds the lock on an object, other threads may be allowed to attempt to execute additional synchronization operations on the object, and may execute non-synchronized operations on the object. Thread synchronization is a process by which threads may interact to check the status of objects, whether the objects are locked or unlocked, while allowing only the thread which holds an object lock to execute synchronized operations on the locked object. Thread synchronization also enables threads to obtain and remove object locks.

When threads are synchronized, in order to make certain that only the thread that possesses an object lock is allowed to operate on a locked object, synchronization constructs are generally provided. One such synchronization construct is known in the art as the monitor. Monitors are simple yet fundamental thread synchronization constructs used in, for example, the JAVA™ platform of the Sun Microsystems Corporation of Palo Alto, Calif. Typically, monitors are implemented using low-level synchronization primitives such as mutexes and the like. Even though programs may perform monitor operations on any object, it is generally too space inefficient to include a monitor implementation for every object. One alternative to having every object have its own monitor is to maintain a hash table that maps objects to monitors. Unfortunately, the use of hash tables introduces additional overhead in monitor lookup as well as causing multiple threads to contend for the access to the global hash table. However, even the use of hash tables can result in substantial overhead in those situations where only a small number of monitor operations are invoked.

Since experience has shown that the majority of monitor operations do not contend with monitor operations performed by other threads, one attempt at improving monitor utilization utilizes a small number of bits in the object header to handle the non-contended monitor operations. One such implementation, referred to as a "thin lock", or lightweight monitor, is described in "Thin Locks: Featherweight Synchronization for Java" by David F. Bacon et al. (1998), 258–268 which is incorporated by reference in its entirety. As described, the lightweight monitor is formed of bits reserved in the object header that identifies which thread, in the form of a thread ID, owns the lightweight monitor and therefore has locked the associated object. In the case when monitor contention does occur, the virtual machine allocates a heavyweight monitor for the contended object.

Figure 2A:
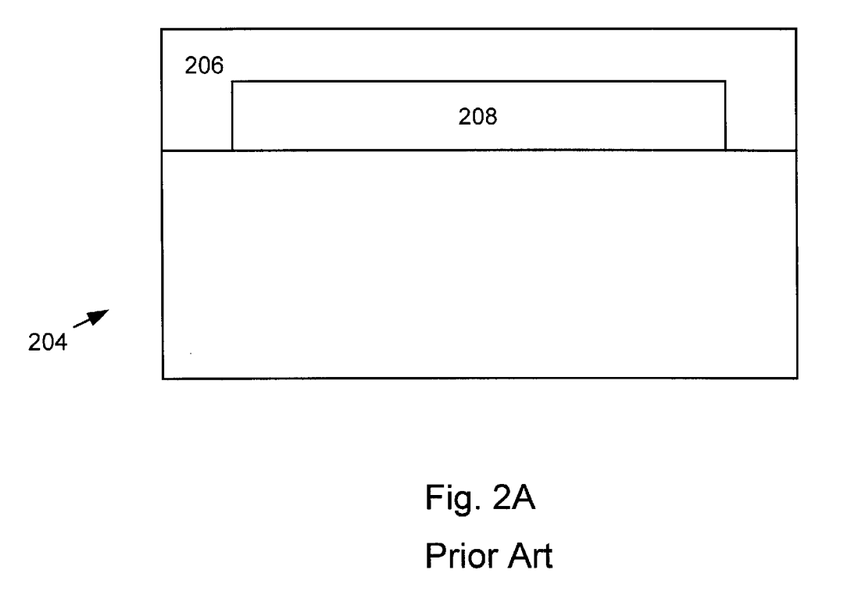
FIG. 2A is a diagrammatic representation of the associations between a thread, an object, and a monitor.

FIG. 2a is a diagrammatic representation of the interface between a thread, an object, and a monitor in an object based system. A thread 202 attempts to execute the synchronization operation on an object 204 having a header 206. In order to execute synchronization operation, the thread 202 must first determine if the object 204 is owned by another thread and therefore unavailable, or locked. The thread 202 determines whether or not the object 204 is locked by entering a monitor 208 included in the object header 206. The monitor 208 represents either a lightweight monitor (otherwise referred to as a thin lock) or a pointer to a heavyweight monitor (also referred to as a fat lock). Generally, one bit in the monitor 208 (referred to as HEAVY_FLAG) indicates whether the monitor 208 is a lightweight monitor or a heavyweight monitor pointer. When the monitor is a lightweight monitor, the HEAVY_FLAG is set to "0" and, conversely, is the HEAVY_FLAG is set to "1" if it contains a heavyweight monitor pointer.

Figure 2B:
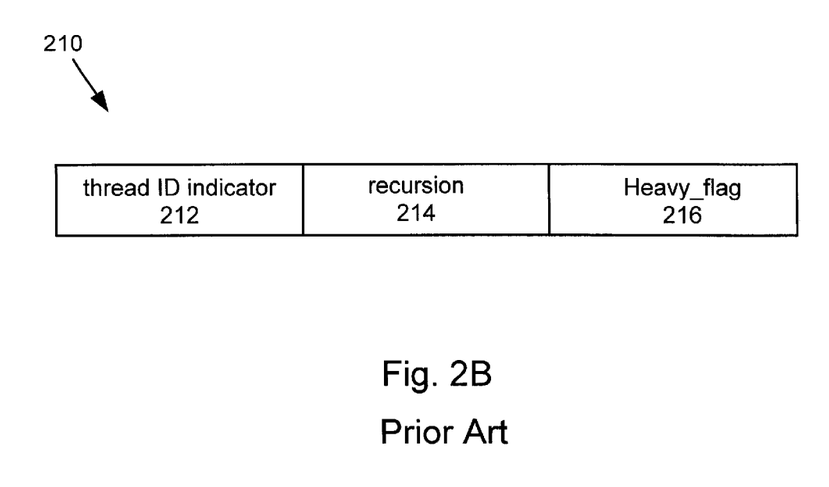
FIG. 2B is a diagrammatic representation of a lightweight monitor.

Typically, lightweight monitors are used for objects that are not subject to contention, i.e.; do not have wait, notify, or notifyALL operations performed upon them. The structure of a typical lightweight monitor 210 included in the object header 206 is shown in FIG. 2b. The lightweight monitor 210 includes a thread identifier 212, a nested lock count (recursion counter) 214, and a HEAVY_FLAG bit. In the situation where the thread identifier 212 (corresponding to the object 204) is zero, the associated object 204 is unowned and unlocked. If, however, the thread identifier 212 in not zero (i.e.; is a thread ID), it represents an index into a table that maps thread IDs to thread pointers. In this case, the thread ID stored in the thread identifier 212 points to the thread which owns the object 204.

In order to enter a monitor, the thread 202 typically performs a compare and swap operation on the monitor. In a compare and swap operation, the new value is the thread ID associated with the thread 202 and the comperand is zero. If the compare and swap operation is successful, the thread ID, recursion counter, and all flags (such as the HEAVY_FLAG) in the monitor 208 were all zero indicating that the monitor was unowned. After the compare and swap operation has been successfully completed, the monitor 208 holds the thread ID associated with the thread 202 which indicates the thread 202 now owns the monitor 208. In those cases where a thread is re-entering a monitor it already owns (i.e.; the monitor is re-entrant), the thread must first increment the recursion counter without causing the recursion counter to overflow. In the case where incrementing the recursion counter would result in an overflow condition, the thread must inflate the lightweight monitor into a heavyweight monitor with itself as owner. It should be noted that only current monitor owners are able convert a lightweight monitor to a corresponding heavyweight monitor. Typically, inflation is accomplished by performing a compare and swap operation on the object header with the new value being a heavyweight monitor pointer.

Assuming now that a second thread 216 subsequently attempts to lock the object 204 owned by the thread 202. As before, the thread 216 will attempt to enter the monitor 208 by performing a compare and swap. In this case, however, the operation will fail since the comperand is the thread ID associated with the thread 216 and the thread ID stored in the monitor 208 is that for the thread 202. Thread 216 will then check to see whether it has already locked the object 204, and this test will also fail indicating since the object 204 is locked by the thread 202. At this point, the monitor 208 is contended and in order for the thread 216 to execute a synchronous operation on the object 204, the thread 216 must force a conversion of the lightweight monitor to a heavyweight monitor. However, since this conversion can only be performed by the current monitor owner, i.e. thread 202, the thread 216 enters a spin-lock loop on the object 204. By spin lock loop, the thread 216 enters a wait queue until such time as the thread 202 unlocks the object 204 at which time it is available to the thread 216 (as well as any other threads). As well known in the art, spin locking in general is undesirable due in part to its inefficient use of system resources. Spin locking is especially inefficient in those cases where the object 204 is locked for a long period of time causing additional threads to spin lock on the object 204. In addition, "starving" low priority threads is a distinct possibility in those situations where higher priority threads are spin locked on the same object.

Therefore, what is desired is an efficient method and apparatus for converting a contended lightweight monitor into a heavyweight monitor in an object-based system that utilizes synchronized threads.

SUMMARY OF THE INVENTION

Broadly speaking, the invention relates to an improved method, apparatus and computer system for efficiently converting a lightweight monitor associated with a contended object into a heavyweight monitor. According to one aspect of the invention, for a first thread to execute a synchronous operation on an object owned by a second thread, the first thread creates a new heavyweight monitor and sets the second thread as owner of the newly created heavyweight monitor. The first thread then enters the heavyweight monitor. In this manner, the first thread is not required to spin lock until such time as the second thread unlocks the object.

The invention can be implemented in numerous ways, including as a method, a computer system, and an apparatus. Several embodiments of the invention are discussed below. Methods and apparatus are disclosed. According to one aspect of the present invention, a computer-implemented method for converting a lightweight monitor to a heavyweight monitor when an object owned by a second thread is unavailable to a first thread includes determining ownership of the object associated with the lightweight monitor. If it is determined that the second thread owns the object, the first thread creates a new heavyweight monitor. The first thread then sets second thread as the owner of the newly created heavyweight monitor. The first thread then enters the newly created heavyweight monitor.

According to yet another aspect of the present invention, a computer system includes a memory and a plurality of threads. The computer system also includes a processor coupled to the memory and an object that includes an object header, the object header being arranged to contain a lightweight monitor that includes information relating to the ownership of object. A first thread selected from the plurality of threads that has locked the object as indicated by a first thread ID included in the lightweight monitor; and a second thread selected from the plurality of threads, the second thread being arranged to convert the lightweight monitor to a corresponding heavyweight monitor owned by the first thread when the object is not available to the second thread.

According to still another aspect of the invention, a computer program product for converting a lightweight monitor into a heavy weight monitor when a first thread attempts to execute a synchronous operation on an object having an object header containing the lightweight monitor is disclosed. The computer program product includes computer code that determines ownership of the object, that creates a heavyweight monitor when it is determined that the object is owned by a second thread, that sets ownership of the heavyweight monitor to the second thread; and computer code that causes the first thread to enter the heavyweight monitor; and a computer readable medium that stores the computer codes.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

In a multi-threaded, object-based computing system, objects are typically provided with synchronization constructs to make it possible to prevent more than one thread from operating on an object at any particular time. One such synchronization construct is referred to as a monitor. A monitor is generally arranged such that only the thread which owns the monitor associated with an object is permitted to execute a synchronized operation on that object. Monitors may be either lightweight or heavyweight. Typically, lightweight monitors are preferable for objects that are not subject to contention, whereas heavyweight monitors are preferably used to handle contended monitor operations.

In one described embodiment of the present invention, a system that widely uses lightweight monitors is contemplated. When a first thread attempts to execute a synchronization operation on an object owned by another thread through the use of a lightweight monitor, the first thread creates a heavyweight monitor setting the second thread as the owner of the newly created heavyweight monitor. The first thread then enters the heavyweight monitor. This arrangement is an inexpensive and efficient method for converting the lightweight monitor associated with a contended object to a corresponding heavyweight monitor.

Figure 3A:
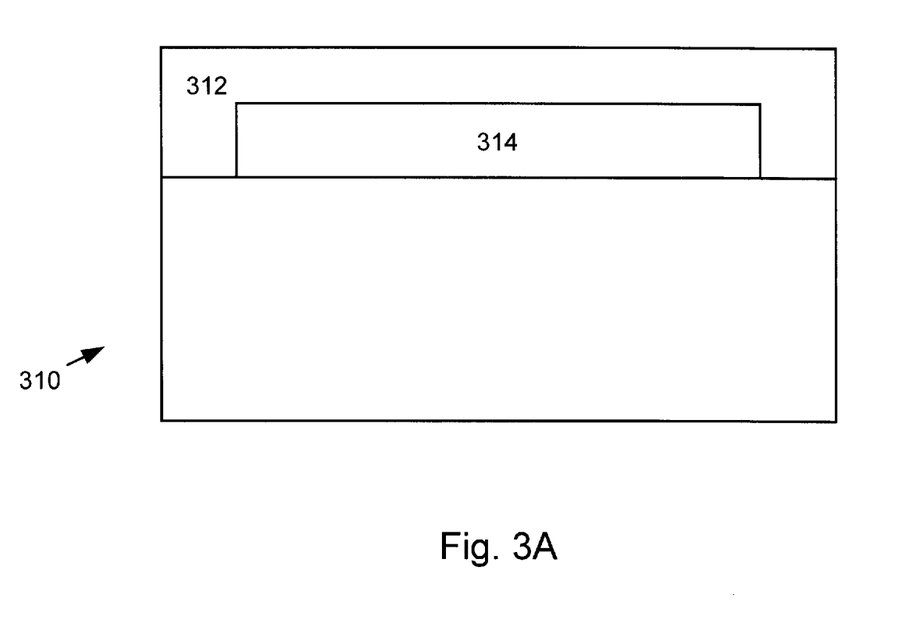
FIG. 3A is a diagrammatic representation of an object in accordance with an embodiment of the present invention.

Referring now to FIG. 3a, a thread stack and an object will be described in accordance with an embodiment of the present invention. An execution stack 302, which is local to a thread, is used when a synchronized operation, in this case an invocation of a synchronized method "foo" 304, is invoked. Synchronized method foo 304 is executed on stack 302, as will be appreciated by those skilled in the art. A stack pointer 306 points to a current memory address or location, e.g., location 308, within stack 302.

Figure 3B:
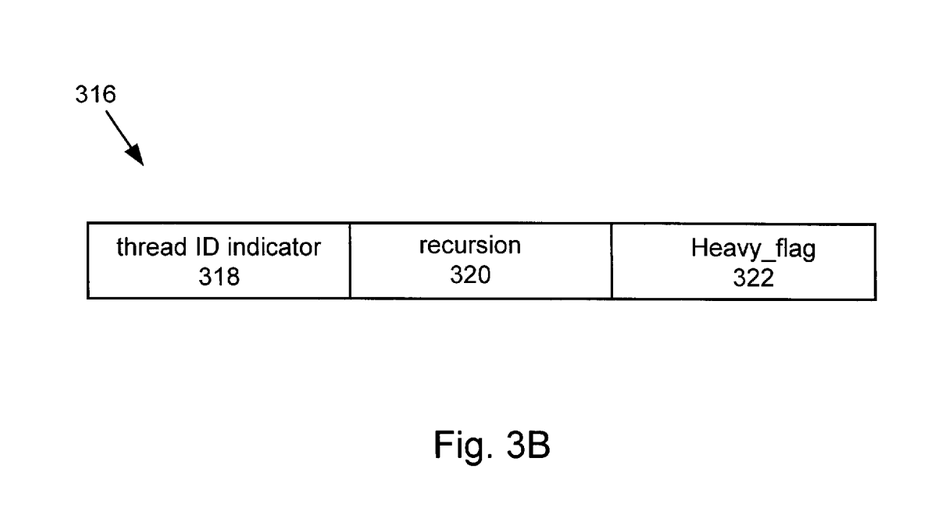
FIG. 3B is a diagrammatic representation of a lightweight monitor in accordance with an embodiment of the present invention

An object 310, upon which method foo 304 may be invoked, includes an object header field 312. Header field 312 generally includes information which is relevant to object 310. By way of example, header field 312 may include identity hash values and garbage collection, i.e., memory management information. The object header field 312 may also include a monitor 314 that when object 310 is unlocked, (hence free to be locked by a thread) the monitor 314 is a lightweight monitor 316 having a thread ID indicator 318, a recursion counter 320, and a HEAVY_FLAG indicator 322. HEAVY_FLAG indicator 322, in the described embodiment, is a tag bit indicative of whether the monitor 314 is a lightweight monitor or a heavyweight monitor. As shown, when HEAVY_FLAG indicator 322 has a value of "0," the monitor 314 is a lightweight monitor. Conversely, when the HEAVY_FLAG indicator 322 has a value of "1", the monitor 314 is a heavyweight monitor.

In one embodiment, a thread 326 having a current thread ID enters a monitor by performing an atomic compare and swap operation on the object header 312. In the atomic compare and swap operation, the new value to be swapped in is the current thread ID and the comperand value (i.e.; the value used to compare) is "0". Therefore, if the operation was successful, the thread ID, recursion counter, and flags stored in the object header were all "0" indicating that the object was unowned. It should be noted that as a matter of course, all newly instantiated objects have "0" values stored in the lightweight monitor fields.

After the successful completion of the atomic compare and swap operation, the object header 312 holds the current thread ID indicating that the thread 326 now owns the object. More particularly, the thread ID indicator 318 will be replaced with the thread ID of the thread 326, the recursion counter 320 will be incremented to indicate that the thread 326 has locked the object 310 at least once, and the HEAVY_FLAG indicator 322 will remain set to "0" indicating a lightweight monitor.

However, in the case where the atomic compare and swap has failed, there are three possibilities. The first possibility is that the current thread 326 already owns the lightweight monitor since the object header 312 holds the current thread ID of the thread 326 (remembering that the comperand is "0") and the HEAVY_FLAG indicator 322 was "0". The second possibility is that the object header 312 contains a heavyweight monitor pointer and therefore the HEAVY_FLAG indicator 322 was "1". The third possibility is that another thread owns the lightweight monitor since the object header 312 holds the thread ID of the other thread and the HEAVY_FLAG indicator 322 was "0".

Figure 4:
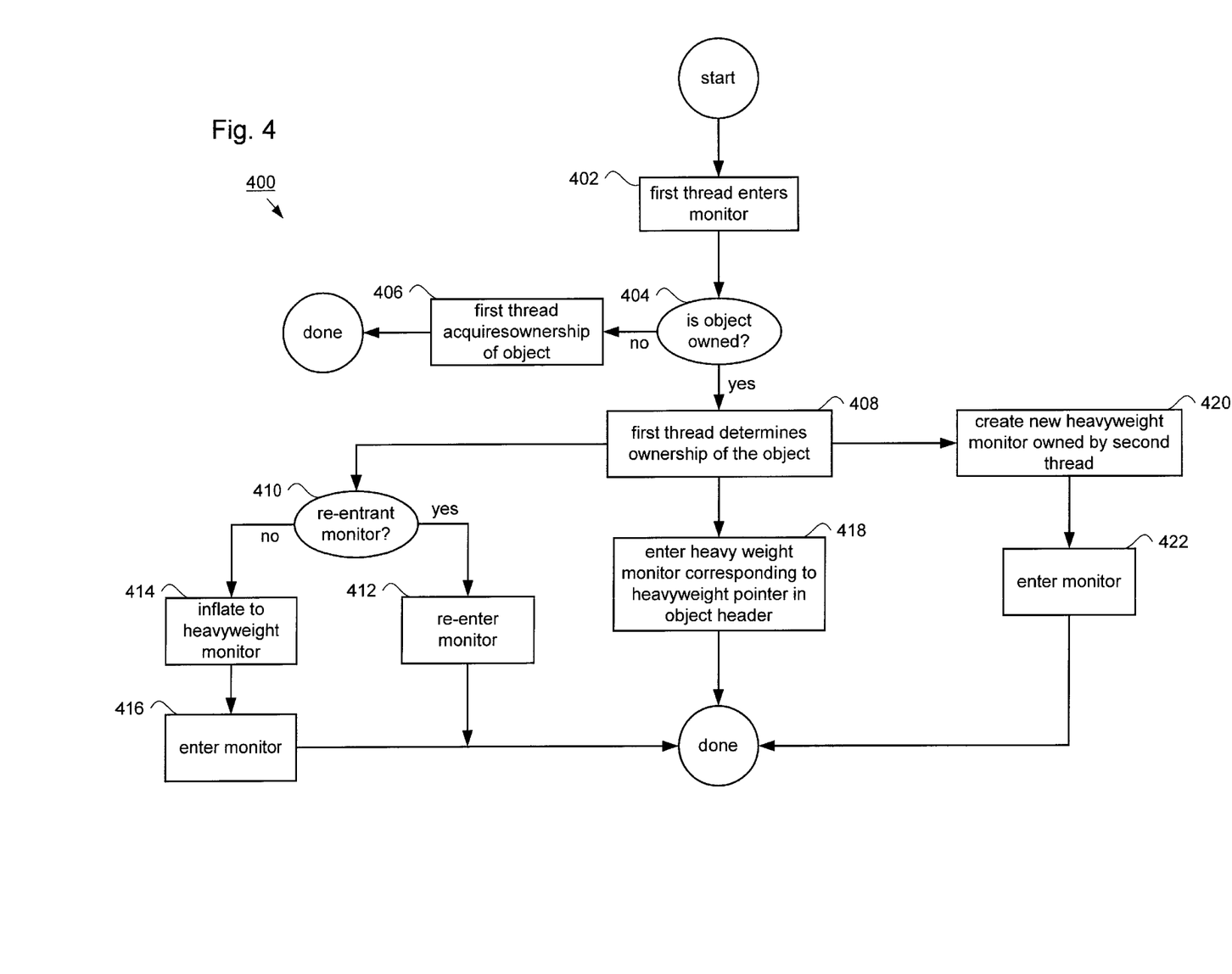
FIG. 4 is a process flow diagram that illustrates a process for converting a lightweight associated with a contended object to a corresponding heavyweight monitor in accordance with an embodiment of the invention.

FIG. 4 is a process flow diagram that illustrates a process 400 for converting a lightweight associated with a contended object to a corresponding heavyweight monitor in accordance with an embodiment of the invention. In the described embodiment, the process 400 begins by a first thread entering (402) the lightweight monitor associated with the object. The first thread then determines whether the object is owned (404). If the object is unowned, then the first thread acquires ownership of the object (406) by, in one embodiment, swapping in its thread ID into the lightweight monitor. If, however, the object is already owned, the first thread must then determine who owns the object. In one embodiment, ownership determination is accomplished by the first thread reading the contents of monitor included in the object header (408). If the monitor contains a first thread ID corresponding to the first thread, then the monitor is a lightweight monitor and the object is owned by the first thread.

It is then determined if the lightweight monitor is re-entrant (410). If it is determined that the lightweight monitor is re-entrant, then the first thread re-enters the lightweight monitor (412). If, however, the lightweight monitor is not re-entrant then the first thread inflates the lightweight monitor to a corresponding heavyweight monitor (414) associated with the object. Once inflated, the first thread then enters the heavyweight monitor (416).

Returning to (408), if it had been determined that the monitor included in the object header contained a heavyweight monitor pointer, then the monitor was a heavyweight monitor corresponding to the heavyweight monitor pointer. The first thread then enters (418) the heavyweight monitor.

Returning to (408) if it had been determined that the monitor included in the object header contained a second thread ID associated with a second thread, then the first thread creates a new heavyweight monitor owned by the second thread (420). The first thread then enters the newly created heavyweight monitor (422).

Figure 5:
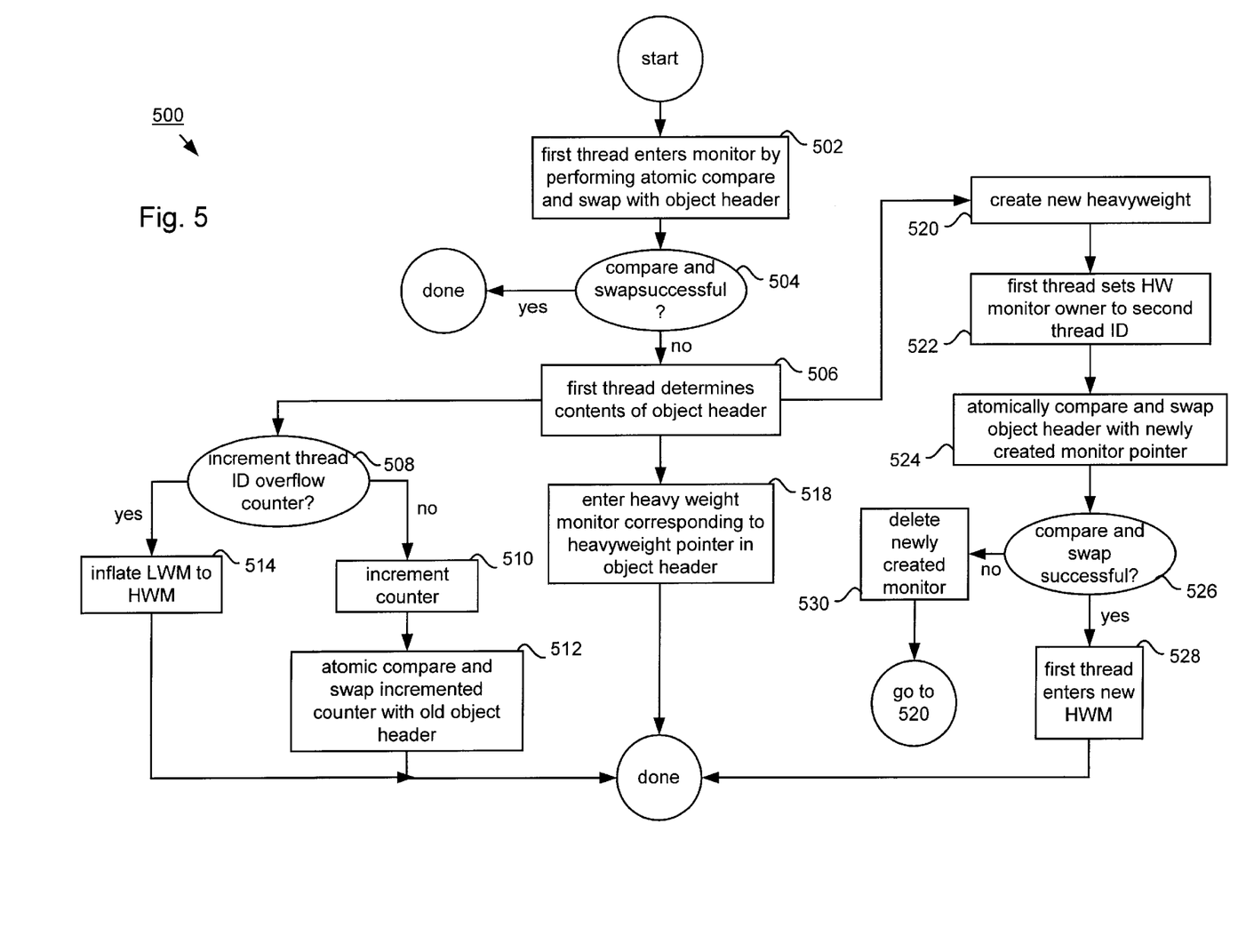
FIG. 5 is one possible implementation of the process described in FIG. 4.

FIG. 5 is a detailed flowchart describing a process 500 as one possible implementation of the process 400 shown in FIG. 4. As such, the process 500 also provides for a first thread to execute a synchronous operation on an object owned by a second thread without being forced to spin lock until such time as the object is unlocked by the second thread.

The process 500 begins by the first thread entering the monitor associated with the object. In one embodiment, entering a monitor is accomplished by performing an atomic compare and swap operation with the object header (502). In the atomic compare and swap operation, the new value to be swapped in is a first thread ID associated with the first thread and the comperand value (i.e.; the value used to compare) is "0". Therefore, if the compare and swap operation was successful, the thread ID, recursion counter, and any flags stored in the object header were all "0" indicating that the object was unowned. It should be noted that as a matter of course, all newly instantiated objects have "0" values stored in the monitor fields. If the compare and swap operation was successful (504), the monitor was an unowned lightweight monitor and a first thread ID associated with the first thread is now contained in the object header indicating that the first thread now owns the object. If, however, the compare and swap operation was unsuccessful, then the object was not unowned and the first thread then determines the contents of the object header (506).

If it is determined that the object header contains the first thread ID, then the first thread owned the object and the monitor was a lightweight monitor. It is then determined if the lightweight monitor is re-entrant. In one implementation, determining if a lightweight monitor is re-entrant is accomplished by determining if a recursion counter included in the lightweight monitor can be incremented without causing an overflow condition (508). If it is determined that, the recursion counter can be incremented without causing an overflow condition, the lightweight monitor is re-entrant and the recursion counter is incremented (510) accordingly. In one embodiment, the recursion counter is incremented by performing an atomic compare and swap operation on the object header. In this way, no other thread can gain ownership of the object prior to completion of the incrementing.

Once the recursion counter as been successfully incremented, the first thread re-enters the lightweight monitor by performing a compare and swap operation between the incremented recursion counter and the object header (512).

Returning to (508), if it is determined that the lightweight monitor is not re-entrant, since, for example, incrementing the recursion counter would cause an overflow condition, the lightweight monitor is inflated to a corresponding heavyweight monitor (514). The first thread then enters the corresponding heavyweight monitor (516).

Returning to (506), if it is determined that the object header contains a heavyweight monitor pointer, then the monitor associated with the object was a heavyweight monitor. In this case, the first thread enters (518) the heavyweight monitor pointed to by the heavyweight monitor pointer. In one embodiment of the invention, the entering is accomplished by performing an atomic compare and swap operation on the object header and the heavyweight monitor pointer.

Returning to (506), if it is determined that the object header contains a second thread ID associated with the second thread, the first thread then creates a new heavyweight monitor (520). The first thread then sets the new heavyweight monitor owner to the second thread (522). In one embodiment, ownership is set by performing an atomic compare and swap operation between the object header and the newly created heavyweight monitor pointer (524). If the compare and swap operation was determined to be successful (526), then the first thread enters the newly created heavyweight monitor (528). If, however, the compare and swap operation was unsuccessful (526), then the newly created heavyweight monitor is deleted (530) and the process returns to (520). Reasons for an unsuccessful compare and swap operation include, for example, a third thread taking ownership of the newly created heavyweight monitor prior to the compare and swap operation. In this case, another new heavyweight monitor must be created (520).

Figure 6:
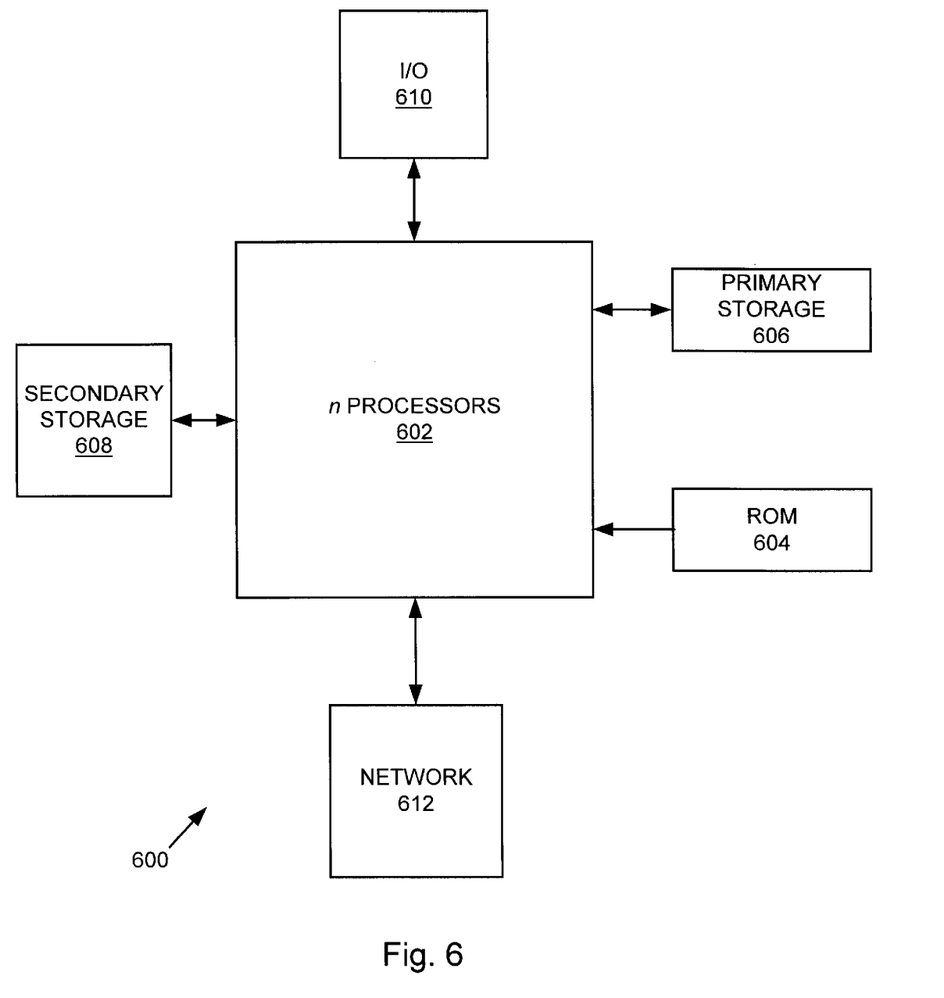
FIG. 6 illustrates a typical, general-purpose computer system suitable for implementing the present invention.

FIG. 6 illustrates a typical, general-purpose computer system 600 suitable for implementing the present invention. The computer system 600 includes any number of processors 602 (also referred to as central processing units, or CPUs) that are coupled to memory devices including primary storage devices 604 (typically a read only memory, or ROM) and primary storage devices 606 (typically a random access memory, or RAM).

Computer system 600 or, more specifically, CPUs 602, may be arranged to support a virtual machine, as will be appreciated by those skilled in the art. One example of a virtual machine that is supported on computer system 600 will be described below with reference to FIG. 7. As is well known in the art, ROM acts to transfer data and instructions uni-directionally to the CPUs 602, while RAM is used typically to transfer data and instructions in a bi-directional manner. CPUs 602 may generally include any number of processors. Both primary storage devices 604, 606 may include any suitable computer-readable media. A secondary storage medium 608, which is typically a mass memory device, is also coupled bi-directionally to CPUs 602 and provides additional data storage capacity. The mass memory device 608 is a computer-readable medium that may be used to store programs including computer code, data, and the like. Typically, mass memory device 608 is a storage medium such as a hard disk or a tape which generally slower than primary storage devices 604, 606. Mass memory storage device 608 may take the form of a magnetic or paper tape reader or some other well-known device. It will be appreciated that the information retained within the mass memory device 608, may, in appropriate cases, be incorporated in standard fashion as part of RAM 606 as virtual memory. A specific primary storage device 604 such as a CD-ROM may also pass data uni-directionally to the CPUs 602.

CPUs 602 are also coupled to one or more input/output devices 610 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 602 optionally may be coupled to a computer or telecommunications network, e.g., an internet network or an intranet network, using a network connection as shown generally at 612. With such a network connection, it is contemplated that the CPUs 602 might receive information from the network, or might output information to the network in the course of performing the above-described method steps. Such information, which is often represented as a sequence of instructions to be executed using CPUs 602, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, steps involved with locking an object and unlocking an object may be reordered. Steps may also be removed or added without departing from the spirit or the scope of the present invention.

Although the methods of converting a lightweight monitor to a heavyweight monitor in accordance with the present invention are particularly suitable for implementation with respect to a Java™ based environment, the methods may generally be applied in any suitable object-based environment. In particular, the methods are suitable for use in platform-independent object-based environments. It should be appreciated that the methods may also be implemented in some distributed object-oriented systems.

Monitors have been described as being bits that identify whether an object is locked, unlocked, or busy. It should be noted that the number of bits associated with a monitor are generally be widely varied. In addition, it should be appreciated that the status of an object may be identified using mechanisms other than a monitor. By way of example, the object may include a pointer to a list that identifies the status of the object.

While the present invention has been described as being used with a computer system that has an associated virtual machine, it should be appreciated that the present invention may generally be implemented on any suitable object-oriented computer system. Specifically, the methods of locking an unlocking an object in accordance with the present invention may generally be implemented in any multi-threaded, object-oriented system without departing from the spirit or the scope of the present invention. Therefore, the present examples are to be considered as illustrative and not restrictive, and the invention is not to be limited to the details given herein, but may be modified within the scope of the appended claims along with their full scope of equivalents.

What is claimed is:

1. A computer implemented method for converting a lightweight monitor into a heavy weight monitor when a first thread attempts to execute a synchronous operation on an object associated with the lightweight monitor, the object having an object header containing the lightweight monitor, comprising:

determining ownership of the object by the first thread;

creating a heavyweight monitor by the first thread when it is determined that the object is owned by a second thread;

setting ownership of the heavyweight monitor to the second thread by the first thread; and entering the heavyweight monitor by the first thread such that the first thread can execute the synchronous operation on the object without being forced to wait until such time as the object is unlocked by the second thread.

2. A method as recited in claim 1, wherein the determining ownership further includes:

performing an atomic compare and swap operation between the first thread and the object header; and determining if the compare and swap operation was successful.

3. A method as recited in claim 2, wherein when it is determined that the operation was not successful, then determining the contents of the object header.

4. A method as recited in claim 3, wherein when it is determined that the object header contains a second thread ID corresponding to the second thread, then creating a new heavyweight monitor, and setting the new heavyweight monitor owner to the second thread.

5. A method as recited in claim 4, wherein the setting the new heavyweight monitor owner further includes:

performing an atomic compare and swap operation between the object header and a heavyweight monitor pointer associated with the new heavyweight monitor.

6. A method as recited in claim 3, wherein when it is determined that the object header contains a heavyweight monitor pointer, then the first thread entering the heavyweight monitor corresponds to heavyweight pointer contained in the object header.

7. A method as recited in claim 3, wherein when it is determined that the object header contains a first thread ID corresponding to the first thread, then determining if incrementing the recursion counter included in the lightweight monitor will cause an overflow condition.

8. A method as recited in claim 7, wherein when it is determined that incrementing the recursion counter will not cause the overflow condition, then re-entering the lightweight monitor by the first thread.

9. A method as recited in claim 7, wherein when it is determined that incrementing the recursion counter will cause an overflow condition, then converting the lightweight monitor to a corresponding heavyweight monitor.

10. A computer program product for converting a lightweight monitor into a heavy weight monitor when a first thread attempts to execute a synchronous operation on an object owned by a second thread associated with the lightweight monitor, the object having an object header containing the lightweight monitor, comprising:

computer code that determines ownership of the object by the first thread;

computer code that creates a heavyweight monitor by the first thread when it is determined that the object is owned by the second thread;

computer code that sets ownership of the heavyweight monitor by the first thread to the second thread;

computer code that causes the first thread to enter the heavyweight monitor such that the first thread can execute the synchronous operation on the object without being forced to wait until such time as the object is unlocked by the second thread; and a computer readable medium that stores the computer codes.

11. A computer program product according to claim 10 wherein the computer readable medium is a data signal embodied in a carrier wave.

12. A computer program product according to claim 10 further including computer code that performs an atomic compare and swap operation between the first thread and the object header and determines if the compare and swap operation was successful.

13. A computer program product according to claim 12 wherein when the compare and swap operation was successful, computer code that determines the contents of the object header.

14. A computer program product according to claim 13, wherein when it is determined that the object header contains a second thread ID corresponding to the second thread, then computer code that creates a new heavyweight monitor, that sets the new heavyweight monitor owner to the second thread, and that performs an atomic compare and swap operation between the object header and a heavyweight monitor pointer associated with the new heavyweight monitor.

15. A computer system including a memory which includes a plurality of threads, comprising:

an object including an object header arranged to contain a lightweight monitor which includes information relating to the ownership of object, a first thread selected from the plurality of threads that has locked the object as indicated by a first thread ID included in the lightweight monitor; and a second thread selected from the plurality of threads, the second thread being arranged to convert the lightweight monitor to a corresponding heavyweight monitor owned by the first thread when the object is not available to the second thread such that the second thread can execute a synchronous operation on the object without being forced to wait until such time as the object is unlocked by the first thread.

16. A computer system as recited in claim 15 wherein the lightweight monitor includes a recursion counter indicative of the number of times the object has been re-entered.

17. A computer system as recited in claim 16, wherein the object header includes a heavyweight monitor pointer that points to the heavyweight monitor associated with the object.

* * * * *